Patented Apr. 3, 1945

2,373,004

UNITED STATES PATENT OFFICE 2,373,004

METHOD OF REMOVING WEAKLY ACIDIC BODIES FROM HYDROCARBON OILS

George W. Ayers, Jr., Chicago, and Lawrence M. Henderson, Winnetka, Ill., assignors to The Pure Oil Company, Chicago, Ill., a corporation of Ohio No Drawing. Application July 18, 1942, Serial No. 451,500

12 Claims. (Cl. 196—30)

This invention relates to the removal of weakly acidic bodies from water-immiscible organic liquids and is more particularly concerned with the removal of mercaptans from hydrocarbon oils such as gasoline.

In applications Serial Numbers 341,904 and 388,982, now Patents Nos. 2,316,753 and 2,297,621, respectively, applicants have disclosed and claimed the use of alkali solutions containing alkali naphthenates, together with a substance (solventizer) to keep the alkali naphthenates in solution, for removing weakly acidic bodies from water-immiscible organic liquids. Among the solventizers which have been disclosed for keeping the naphthenates in solution are various phenols and glycols. The naphthenic acid salts enhance the mercaptan-extracting ability of the alkali solution, or, in other words, promote the solubility of the mercaptans in the alkali solution.

We have now discovered that the mercaptan-extracting ability of alkali solutions fortified with solubility promoters such as alkali naphthenates, phenolates and others can be further enhanced by incorporating in the solution various amines which are compatible with the solution, that is, do not cause separation of the solution into two or more phases nor cause precipitation of the solution, and which are stable at temperatures at which the solutions are regenerated. We may use aliphatic, aromatic, and hydro-aromatic amines and polyamines, including diamines, triamines, tetramines and pentamines. We may also use mono or poly hydroxy substituted amines and polyamines. Compounds contemplated by our invention may be primary, secondary, tertiary and quaternary amines or may contain a combination of various amino groups. As specific examples of compounds which we have found to be satisfactory are dialkylamine, hydroxyethylethylenediamine, diethylenetriamine, triethylenetetramine, tetraethylenepentamine and triethanolamine. We prefer to use amines having a high enough boiling point so that they do not volatilize at the temperatures of regeneration, since compounds which are too volatile introduce additional problems of recovery during the regeneration step.

Our invention is applicable to solubility promoters other than alkali naphthenates such as alkali metal salts of low boiling fatty acids having from 2 to 6 carbon atoms and the alkali metal salts of petroleum acidic bodies such as phenols, naphthenic acids and fatty acids found in used caustic alkali solutions. These acidic bodies may either be "sprung" from the used caustic solutions by means of acid and redissolved in fresh caustic alkali solution or the used caustic alkali solution containing the salts may be regenerated and concentrated so as to contain in concentrated form the alkali salts of acids and phenols extracted from the oil treated with the fresh caustic alkali solution.

Our invention is particularly applicable, however, to aqueous solutions containing alkali metal naphthenates and alkali metal phenolates or other solventizers. By "alkali metal naphthenates" is meant the alkali metal salts of naphthenic acids. Such acids occur in crude petroleum oil and have a cyclic structure. Examples of such acids are the carboxylic acids of cyclopentane and cyclohexane. In general the naphthenic acids contemplated are those more fully set forth in the aforesaid application Serial No. 341,904, now Patent No. 2,316,753.

In order to demonstrate the invention a series of tests were made in which gasoline produced by non-catalytic pyrolytic cracking of petroleum oil under high pressure was mixed with 7 per cent by volume of various treating solutions and mechanically agitated for ten minutes in a nitrogen atmosphere. In each of the tests 300 cc. of gasoline were mixed with 21 ccs. of the treating agent. The composition of the various treating solutions used in the tests are set forth in Table I.

TABLE I

*Composition of treating solutions in per cent by weight*

| Ingredients | A | B | C | D | E | F | G | H | I | J | K | L | M |
|---|---|---|---|---|---|---|---|---|---|---|---|---|---|
| NaOH (free) | 12.7 | 12.7 | 12.7 | 12.7 | 12.7 | 12.7 | 12.7 | 12.7 | 12.7 | 12.7 | 12.7 | | |
| Sodium naphthenates | 20.5 | | | 20.5 | 20.5 | | | 20.5 | 20.5 | 20.5 | 20.5 | | |
| Sodium cresolates | 7.6 | | | 7.6 | 7.6 | | | 7.6 | 7.6 | 7.6 | 7.6 | | |
| H₂O | 59.2 | 45.0 | 45.0 | 45.0 | 45.0 | 73.1 | 73.1 | 45.0 | 45.0 | 52.1 | 45.0 | 85.8 | 85.8 |
| Diethanolamine | | 42.3 | | 14.2 | | 14.2 | | | | | | 14.2 | |
| Hydroxyethyl-ethylenediamine | | | 42.3 | | 14.2 | | 14.2 | | | | | | 14.2 |
| Diethylenetriamine | | | | | | | | 14.2 | | | | | |
| Triethylenetetramine | | | | | | | | | 14.2 | | | | |
| Tetraethylenepentamine | | | | | | | | | | 7.1 | | | |
| Triethanolamine | | | | | | | | | | | 14.2 | | |

In preparing the solutions 18.7 parts by weight of naphthenic acids were added to an aqueous caustic soda solution containing 18.3 parts by weight of caustic soda so that the naphthenates were formed in situ. Similarly 6.3 parts by weight commercial cresol was added to the caustic soda solution to form the sodium cresolates. Obviously the solution can be prepared by adding sodium naphthenates and sodium cresolates as such to an aqueous caustic soda solution. The various amines were added to the solution as such and an amount of water removed from the solution equal to the amount of amine added.

The naphthenic acids used in preparing the various solutions containing sodium naphthenates had the following characteristics:

TABLE II

| | |
|---|---|
| API gravity at 60° F | 14.8 |
| Neutralization No. (Mg. KOH per g.) | 240/260 |
| IBP | 260 |
| 10% | 490 |
| 20% | 504 |
| 30% | 516 |
| 40% | 526 |
| 50% | 540 |
| 60% | 554 |
| 70% | 568 |
| 80% | 590 |
| 90% | 622 |
| EP | 624 |
| Per cent recovered | 97.0 |
| 78% | — |
| Apparent molecular weight | 218 |
| Approximate formula | $C_{13}H_{24}O_2$ |

Table III gives the results obtained on mercaptan removal using the various solutions set forth in Table I for treatment of gasolines containing different amounts of mercaptans. The gasoline treated in all cases was disulfide free, but in the course of the treatment a small amount of disulfides formed in some cases. The results for mercaptan extraction have been corrected to exclude the mercaptan converted to disulfide. Solution A represents a solution which has been in successful commercial use. The composition of this solution was arrived at after long experimentation as being the most satisfactory composition under all conditions which are met with in commercial plant operation and, therefore, was used as the basis for the tests. The caustic alkali content of the solution in each case is the same since it is well known that increase in the free caustic alkali present in the solution increases the extracting power of the solution and, therefore, in order to obtain a fair comparison between different solutions, it was necessary to keep the free alkali constant. By free caustic alkali is meant the alkali metal hydroxide present over and above that in combination as naphthenates, cresolates or other compounds.

TABLE III

| Solution used | Per cent mercaptan S in untreated gasoline | Per cent mercaptan S in treated gasoline | Per cent disulfide S in treated gasoline | Per cent mercaptan S extracted from gasoline |
|---|---|---|---|---|
| A | 0.0206 | 0.0081 | 0.001 | 55 |
| B | 0.0206 | 0.0102 | 0.0020 | 42 |
| C | 0.0206 | 0.0060 | 0.0005 | 67 |
| D | 0.0206 | 0.0065 | 0.0011 | 65 |
| E | 0.0206 | 0.0049 | 0.0008 | 74 |
| D | 0.0189 | 0.0054 | 0.0000 | 71 |
| E | 0.0189 | 0.0046 | 0.0000 | 76 |
| A | 0.0189 | 0.0080 | 0.0008 | 53 |
| F | 0.0189 | 0.0105 | 0.0008 | 40 |
| G | 0.0189 | 0.0088 | 0.0008 | 49 |
| A | 0.0179 | 0.0087 | 0.0001 | 51 |
| H | 0.0179 | 0.0023 | 0.0008 | 83 |
| I | 0.0179 | 0.0058 | 0.0000 | 68 |
| J | 0.0179 | 0.0062 | 0.0000 | 65 |
| K | 0.0179 | 0.0051 | 0.0008 | 67 |
| L | 0.0214 | 0.0206 | | 4 |
| M | 0.0214 | 0.0206 | | 4 |

It is evident from Table III that in each case where the particular amine was used in combination with the naphthenates and cresolates the amount of mercaptans extracted was in excess of the amount which could be extracted with a caustic soda solution of the same free caustic soda concentration containing only the naphthenates and cresolates, or containing only the amine in the same concentration. The tests with solutions L and M show that the amines in plain water had substantially no effect on the removal of mercaptans. In these two tests the amount of mercaptans removed was so low that the gasoline was not tested for disulfide so that the 4% showing up as per cent mercaptan sulfur extracted may have been converted to disulfide. Table III also shows that of the amines tested, hydroxyethylethylenediamine and diethylenetriamine were outstanding in enhancing the extraction properties of the solution.

In order to demonstrate the ability of solutions prepared in accordance with my invention to be regenerated, a series of tests were made with solution E. These tests are set forth in Table IV.

TABLE IV

| | Solution used | | | |
|---|---|---|---|---|
| | E | E | E | E |
| No. of regenerations | Fresh | 1 | 2 | 3 |
| Percent mercaptain S in untreated gasoline | 0.0223 | 0.0223 | 0.0223 | 0.0223 |
| Percent mercaptan S in treated gasoline | 0.0050 | 0.0058 | 0.0058 | 0.0058 |
| Percent disulfide S in treated gasoline | 0.0002 | 0.0000 | 0.0012 | 0.0016 |
| Percent mercaptan S extracted from gasoline | 77.6 | 74.0 | 74.0 | 74.0 |

It will be seen that after the first regeneration the mercaptans extracted dropped only 3.6% and then remained constant after the 2nd and 3rd regenerations. The solution was regenerated by heating to boiling temperature (about 225° F.) until the solution was substantially free of alkyl mercaptides. Temperatures ranging from about 212° F. to 250° F. are satisfactory for non-oxidation regeneration.

Where it is intended to regenerate by heating to boiling temperature or by steam stripping, the boiling point of the amines used should be above the regeneration temperature. In the event that regeneration is effected by means of oxygen or air blowing followed by washing with naphtha to remove disulfides, lower boiling amines may be used since oxidation regeneration may be conducted at lower temperatures.

In addition to the amines set forth in Table I, the following amines were also tried: ethylenediamine, cyclohexylamine, n-amylamine and ethyldiethanolamine. These amines caused separation of the treating solution into two layers when added thereto and therefore were unsatisfactory in connection with the particular solutions containing sodium naphthenates and cresolates.

It will be apparent that the amines may be used in smaller or greater quantities than 14.2% by weight in the treating solution. Generally speaking, however, smaller percentages will result in a lower extraction of mercaptans, and higher percentages will, in general, result in higher percentage of mercaptan extraction. Experience has shown, however, that where the amount of amine is materially above 14.2% emulsion difficulties and difficulties in separating the oil from the treating solution are encountered because of the high viscosity of the treating solution. Discoloration and precipitation during regeneration of the solutions is also experienced with the higher concentrations of amines. The addition of about 14.2% of the amine does not substantially affect the viscosity or other physical properties of the treating solution. In general the amine should not be below about 5% by weight nor in excess of about 25% by weight. We have tested solutions having as much as 28.4% by weight of hydroxylethylenediamine and although the amount of mercaptans extracted by this solution compared very favorably with the amount which can be extracted by caustic methanol solution, the solution was of such high viscosity as to not lend itself readily to commercial use and upon regeneration produced discoloration and precipitation.

It will also be apparent that the quantities of caustic alkali naphthenates and alkali phenolates or other soluble promoters may be varied somewhat. However, it has been our experience that where the amount of free caustic soda is materially above 12.7% by weight, the solution is too viscous to be practical under all temperature conditions met with in commercial operations. If caustic potash is used in place of caustic soda the caustic alkali concentration can be somewhat higher before the viscosity becomes objectionably high. In general, however, the free caustic alkali content should not be below 5% nor more than about 20% by weight.

The per cent of naphthenates present in the solution is controlled to a large extent by the per cent of free alkali present. Lower amounts of alkali permit higher concentrations of naphthenates whereas higher percentages of free alkali require lower amounts of naphthenates since the napthenates will not stay in solution. The amount of solventizer such as cresolates or other phenolates present is dependent largely upon the amount of naphthenates since the phenolates act as a solventizer, that is serve to keep the naphthenates in solution and should be added in sufficient quantity to serve that purpose. In general the naphthenates or other solubility promoters should not be below 10% by weight and not in excess of the maximum amount soluble in the solution.

It will be seen from the foregoing description that we have discovered an improved solution for extracting mercaptans and other weakly acidic bodies from organic liquids.

In addition to enhancing the mercaptan extracting ability of alkali solutions containing solubility promoters, the amines further serve the useful function of inhibiting disulfide formation.

We claim:

1. The method of removing weakly acidic bodies from hydrocarbon oils which comprises contacting such oils with an aqueous caustic alkali solution containing at least 5% by weight of free alkali metal hydroxide, from 5 to 25% of an amine which is compatible with the solution and a solubility promoter for acidic bodies other than the amine, in an amount not less than 10% by weight and not in excess of that amount which is compatible with the solution, the combined amount of solubility promoter and amine being in excess of the maximum amount of the solubility promoter which is compatible with the solution.

2. The method in accordance with claim 1 in which the solubility promoter comprises alkali metal naphthenates and the solution contains sufficient solventizer to keep the napthenates in solution.

3. The method of removing weakly acidic bodies from hydrocarbon oils which comprises concentrating by distillation, used aqueous caustic alkali solution containing petroleum acidic bodies to a point that the solution made as hereinafter set forth will contain not less than 10% by weight of alkali metal salts of said acidic bodies, adding sufficient caustic alkali thereto to bring the free alkali concentration of the final solution above 5% by weight and adding to the solution amines which are compatible with the solution, in an amount sufficient to enhance the ability of the solution to extract acidic bodies from said liquids, the combined amount of alkali metal salts of petroleum acidic bodies and amines being in excess of the maximum amount of alkali metal salts of said petroleum acidic bodies which are compatible with the solution.

4. The method of removing mercaptans from petroleum distillate which comprises contacting said distillate with an aqueous solution containing at least 5% by weight of free caustic alkali, from 5 to 25% of an amine which is compatible with the solution and a solubility promoter for mercaptans other than the amine, in an amount not less than 10% by weight and not in excess of that amount which is compatible with the solution, the combined amount of solubility promoter and amine being in excess of the maximum amount of the solubility promoter which is compatible with the solution.

5. Method in accordance with claim 4 in which the solubility promoter comprises alkali metal salts of petroleum acidic bodies other than mercaptans.

6. Method in accordance with claim 4 in which the solubility promoter comprises alkali metal salts of low boiling aliphatic carboxylic acids.

7. The method of removing mercaptans from hydrocarbon oil comprising contacting said oil with an aqueous solution containing at least 5% by weight of caustic alkali, at least 10% by weight of alkali metal naphthenates, sufficient solventizer to keep the mercaptans in solution, and amines which are compatible with the solution, insufficient amount to enhance the ability of said solution to remove mercaptans from said oil, the combined amount of alkali metal naphthanates and amines being in excess of the maximum amount of alkali metal naphthanates which are compatible with the solution.

8. Method in accordance with claim 7 in which the amine comprises a substantial portion of hydroxyethylethylenediamine.

9. Method in accordance with claim 7 in which the amine comprises a substantial portion of diethylenetriamine.

10. Method in accordance with claim 7 in which the amine is a hydroxy polyamine and is present in amounts ranging from about 5 to 30% by weight.

11. Method in accordance with claim 7 in which the amine is a polyamine and is present in amounts ranging from about 5 to 30% by weight.

12. Method in accordance with claim 7 in which the amine comprises a substantial portion of diethanol amine.

GEORGE W. AYERS, JR.
LAWRENCE M. HENDERSON.